(12) United States Patent
Bright

(10) Patent No.: US 7,393,427 B2
(45) Date of Patent: Jul. 1, 2008

(54) SEMIAUTOMATIC JACKETING METHOD

(75) Inventor: Edward Albert Bright, Littleton, CO (US)

(73) Assignee: Johns Manville, Denver, CO (US)

( * ) Notice: Subject to any disclaimer, the term of this patent is extended or adjusted under 35 U.S.C. 154(b) by 543 days.

(21) Appl. No.: 11/109,581

(22) Filed: Apr. 19, 2005

(65) Prior Publication Data
US 2006/0231193 A1 Oct. 19, 2006

(51) Int. Cl.
*B29D 23/00* (2006.01)
*B29C 53/40* (2006.01)

(52) U.S. Cl. .................. 156/213; 156/215; 156/217

(58) Field of Classification Search ............. 156/213, 156/215, 217, 218, 475, 492, 538
See application file for complete search history.

(56) References Cited

U.S. PATENT DOCUMENTS

| | | | | |
|---|---|---|---|---|
| 2,941,570 A | * | 6/1960 | Plym | ..................... 156/156 |
| 3,585,678 A | | 6/1971 | Neumann et al. | |
| 3,755,039 A | | 8/1973 | Terry | |
| 3,849,240 A | | 11/1974 | Mikulak | |
| 3,890,182 A | | 6/1975 | Terry | |
| 3,899,277 A | * | 8/1975 | Winter | ..................... 425/383 |
| 4,003,189 A | * | 1/1977 | Little et al. | ..................... 53/590 |
| 4,459,251 A | * | 7/1984 | Eldridge et al. | ............. 264/40.5 |
| 5,021,116 A | * | 6/1991 | Milgram et al. | ............. 156/475 |

* cited by examiner

*Primary Examiner*—Richard Crispino
*Assistant Examiner*—Barbara J. Musser
(74) *Attorney, Agent, or Firm*—Robert D. Touslee

(57) ABSTRACT

A method for jacketing a product having a generally cylindrical outer surface locates a sheet of jacketing material on first and second belts for conforming the sheet of jacketing material to and pressing the sheet of jacketing material against the outer surface of the product and locates the product on the sheet of jacketing material. Preferably, the belts are mounted on frames that are pivoted from a first position where the sheet of jacketing material can be placed on the belts and the product can be placed on the sheet of jacketing material to a second position where the belts are each wrapped part of the way around the outer surface of the product while the product remains stationary to conform the sheet of jacketing material to and press the sheet of jacketing material against the outer surface of the product so that the sheet of jacketing material may be bonded to the outer surface of the product. When the frames are pivoted from the first position to the second position, the frames draw the belts over the sheet jacket with a force less than that required to crush the product and greater than that required to overcome friction between the belts and the sheet of jacketing material.

9 Claims, 5 Drawing Sheets

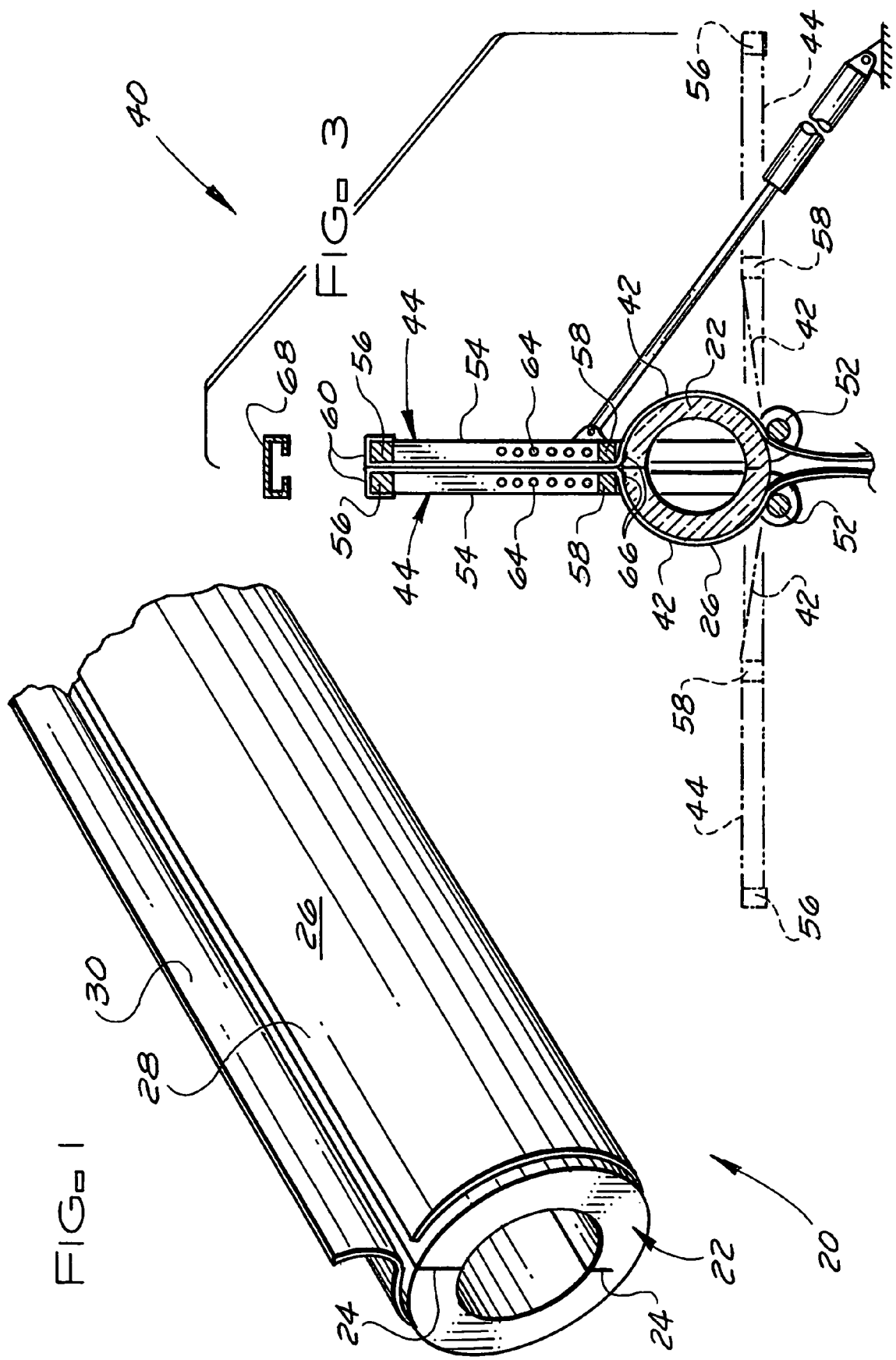

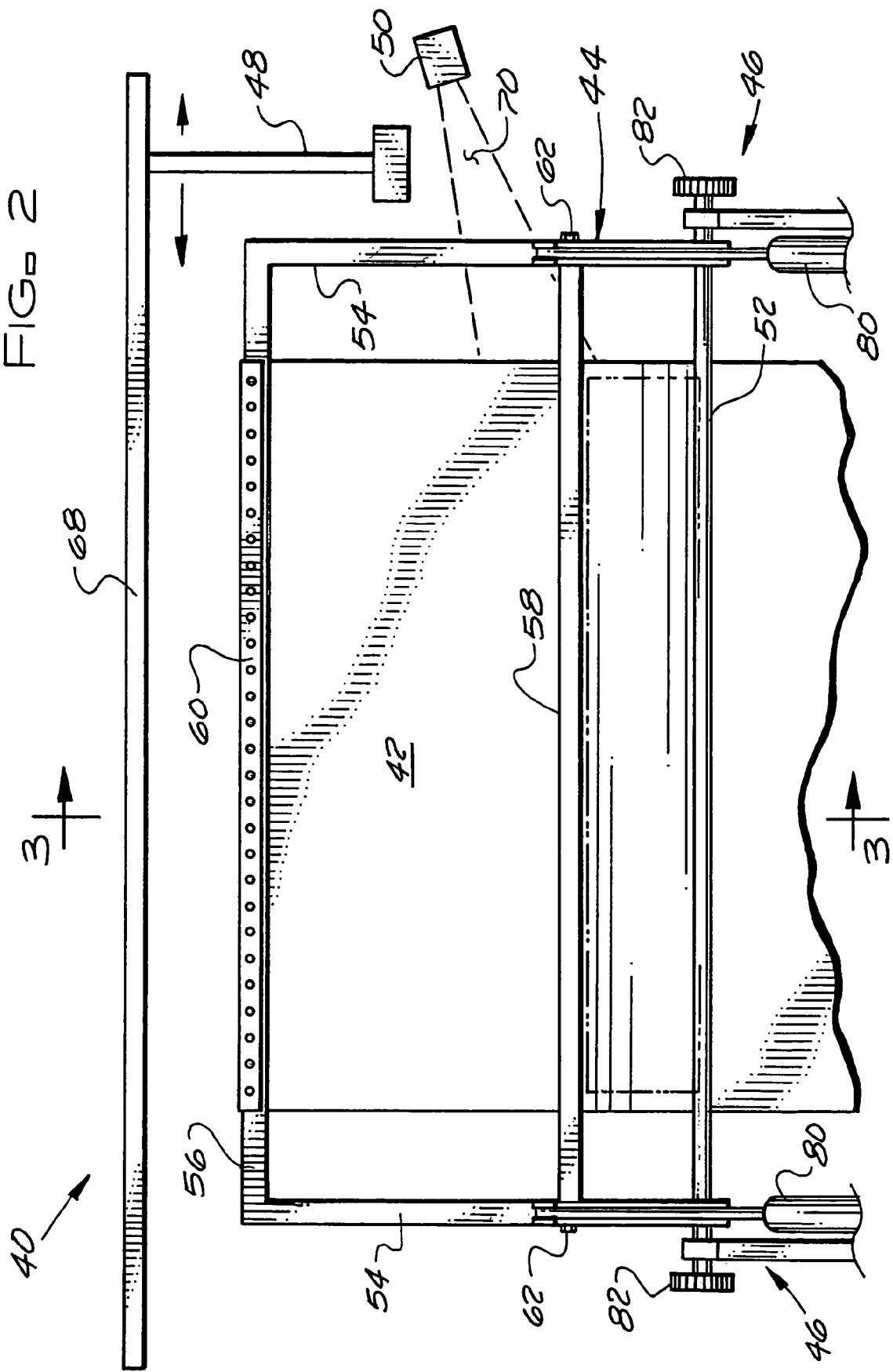

SEMIAUTOMATIC JACKETING METHOD

BACKGROUND OF THE INVENTION

The subject invention relates to an apparatus and method for applying a sheet of jacketing material to a cylindrical product and in particular to an improved semiautomatic apparatus and method for applying a sheet of jacketing material to a cylindrical product, such as but not limited to a tubular pipe insulation product, where the product is retained in a stationary position and the sheet of jacketing material is wrapped about and bonded to the cylindrical outer surface of the product.

Numerous cylindrical products are jacketed to enhance the performance and/or the appearance of such products. While the apparatus and method of the subject invention can be used to apply sheets of jacketing material to numerous products, the apparatus and method of the subject invention are particularly well suited for applying sheets of jacketing material to pieces of pipe insulation. Jacketed tubular pipe insulation is installed upon the pipes of hot and cold piping systems to retard the flow of heat between the pipes of the system and the ambient environment and conserve energy. Typically, this jacketed tubular pipe insulation has a longitudinally extending slit that passes completely through the tubular wall of the pipe insulation on one side and into the interior of and part of the way through the tubular wall of the pipe insulation on the opposite side of the pipe insulation so that the pipe insulation can be opened, passed over, and closed about a pipe. The pipe insulation is jacketed to enhance the performance of the pipe insulation (e.g. to retard the transmission of water vapor); to prevent the pipe insulation from being exposed to contaminants; to make the pipe insulation more aesthetically pleasing; to protect the pipe insulation from adverse climatic conditions; and to serve as a means for securing and sealing the pipe insulation in place on the pipes of a piping system. Customers, such as installers, expect the pre-applied jackets of the jacketed pipe insulation products to be smooth and conform without creases or wrinkles to the cylindrical outer surfaces of the pieces of pipe insulation; to be correctly registered and aligned with the ends of the pieces of pipe insulation; and to be correctly aligned and registered with the longitudinal slits in the pieces of pipe insulation that enable the pieces of pipe insulation to be opened, passed over, and closed about a pipe.

Currently, sheets of jacketing material are normally applied to pipe insulation by one of two methods. One method is a completely manual method and the other method is an automated method. Both of these methods involve rolling a piece of pipe insulation over a sheet of jacketing material to wrap the sheet of jacketing material about the piece of pipe insulation.

When the manual method for applying a sheet of jacketing material to a piece of pipe insulation is employed, an adhesive is applied to the sheet of jacketing material and the piece of pipe insulation is then placed on and manually rolled over the sheet of jacketing material to wrap the sheet of jacketing material about and bond the sheet of jacketing material to the cylindrical outer surface of the pipe insulation. The manual method of applying a sheet of jacketing material to a piece of pipe insulation can frequently result in the misapplication of the sheet of jacketing material to the piece of pipe insulation. The most common flaw encountered with the manual method of jacketing pipe insulation is the failure of the sheet of jacketing material to be tightly wrapped about the cylindrical outer surface of the piece of pipe insulation. In other words, rather than making a jacketed piece of pipe insulation wherein the jacketing material conforms closely to the cylindrical outer surface of the piece of pipe insulation, a piece of jacketed pipe insulation is produced wherein spaces are left between the jacketing material and the outer surface of the pipe insulation. Since this causes the finished product and thus the installation of the product to look shoddy, installers do not want to use such products. These flaws in the product also cause folds or creases in the jacketing material at the ends of the pieces of pipe insulation and where two pieces of pipe insulation are butted up against each other to be sealed with butt strips, the folds or ceases in the jacketing material are not only aesthetically displeasing, but may also prevent the formation of a vapor tight seal at the butt joint.

Other problems that may be encountered with the manual method of applying a sheet of jacketing material to a piece of pipe insulation include the failure to properly adhere the sheet of jacketing material to and/or to properly register the sheet of jacketing material with the piece of pipe insulation. Typically, the adhesive used is a "hot melt" adhesive that only forms an effective bond when the adhesive is at or above a specific temperature. A wholly manual application of the sheets of jacketing material to the pieces of pipe insulation allows for variations in the time between the application of the "hot melt" adhesive and the application of the sheets of jacketing material to the pieces of pipe insulation that can result in a cooling of the "hot melt" adhesive to temperatures where the adhesive no longer forms an effective bond between the jacketing material and the pipe insulation.

The major problems associated with the current automatic methods for applying sheets of jacketing material to pieces of pipe insulation relate to the high costs involved in the manufacture and installation of such equipment. U.S. Pat. No. 3,755,039, issued Aug. 28, 1973 discloses an example of an automatic apparatus and method of jacketing pipe insulation wherein the pieces of pipe insulation are rolled over the sheets of jacketing material.

Another method and apparatus for applying sheets of jacketing material to the cylindrical outer surfaces of ducts involves rotating the duct and feeding a sheet between a roller and the duct to wrap the sheet around and bond the sheet to the duct. The method and apparatus disclosed in U.S. Pat. No. 3,890,182, issued Jun. 17, 1975 are representative of this type of method and apparatus.

SUMMARY OF THE INVENTION

The semiautomatic jacketing apparatus and method of the subject invention provide a solution to the problems encountered in the manual and automatic-jacketing operations of the prior art discussed above. The semiautomatic jacketing apparatus of the subject invention for jacketing a product having a generally cylindrical outer surface, especially tubular pipe insulation, includes first and second belts for conforming a sheet of jacketing material to and pressing the sheet of jacketing material against the generally cylindrical outer surface of the product being jacketed. The belts each have a width substantially equal to or greater than the length of the generally cylindrical outer surface of the product and a length at least substantially equal to and preferably greater than one half of the circumference of the product.

The semiautomatic jacketing apparatus has first and second support frames that support the belts and are mounted on rods about which the frames pivot between first and second positions. In the first position, the sheet of jacketing material can be placed on the first and second belts and the product can be placed on the sheet of jacketing material. In second position, the belts are each wrapped part of the way around generally cylindrical outer surface of the product to conform the sheet of jacketing material to and press the sheet of jacketing material against the generally cylindrical outer surface of the product so that the sheet of jacketing material may be bonded to the generally cylindrical outer surface of the product. The pivotal movement of the support frames from the first position to the second position wraps the belts about the product while the product remains stationary and draws the belts over the rods that pivotally support the frames, the sheet of jacketing material, and the product with a force less than that required to crush the product and greater than that required to overcome friction between the belts and the sheet of jacketing material. This enables the semiautomatic jacketing apparatus and method of the subject invention to be used for the jacketing of products, such as fiberglass pipe insulation, without damaging the products and reducing their performance characteristics such as their thermal insulating properties.

Preferably, the apparatus has an adhesive applicator for automatically applying an adhesive to the generally cylindrical outer surface of the product after the product has been properly positioned on the sheet of jacketing material. The adhesive is used to bond the sheet of jacketing material to the generally cylindrical outer surface of the product when the belts are each wrapped part of the way around the generally cylindrical outer surface of the product to conform the sheet of jacketing material to and press the sheet of jacketing material against the generally cylindrical outer surface of the product.

Where the semiautomatic jacketing apparatus is used to jacket products with a slit or other feature with which the sheet of jacketing material must be properly aligned, such as pipe tubular insulation that has a longitudinally extending slit, the apparatus is provided with a guide mechanism. A preferred guide mechanism for use with pipe insulation having a longitudinal slit is a laser beam that is projected longitudinally along the length of the cylindrical outer surface of the product so that when the slit in the piece of pipe insulation is aligned with the laser beam the pipe insulation is properly oriented for jacketing. While this type of guide mechanism is particularly well suited for pipe insulation, this type of guide mechanism could also be used with products other than pipe insulation.

In the semiautomatic method of the subject invention, a product having a generally cylindrical outer surface, such as a piece of tubular pipe insulation, is manually placed and properly positioned on the semiautomatic jacketing apparatus and the apparatus is activated to apply an adhesive to the generally cylindrical outer surface of the product and wrap the sheet of jacketing material about the product. Once the sheet of jacketing material has been wrapped about and bonded to the product, the product is manually removed from the apparatus. Where the product requires the proper alignment (registration) of a feature of the product with the sheet of jacketing material, preferably, the product is positioned on the apparatus using the guide mechanism of the apparatus.

BRIEF DESCRIPTION OF THE DRAWINGS

FIG. 1 is a partial perspective view of a typical piece of jacketed pipe insulation that has been jacketed with the semiautomatic jacketing apparatus and by the semiautomatic method of the subject invention.

FIG. 2 is a schematic side view of the semiautomatic jacketing apparatus of the subject invention for jacketing products showing the support frames of the semiautomatic jacketing apparatus in the closed position with the belts wrapped about the generally cylindrical outer surface of a product.

FIG. 3 is a schematic cross section of the semiautomatic jacketing apparatus of FIG. 2 taken substantially along lines 3-3 of FIG. 2 to further schematically show the semiautomatic jacketing apparatus in the closed position (in solid line) and to also schematically show the support frames of the semiautomatic jacketing apparatus (in phantom line) in the open position for loading and unloading product from the apparatus.

DESCRIPTION OF THE PREFERRED EMBODIMENTS

Figure 4:
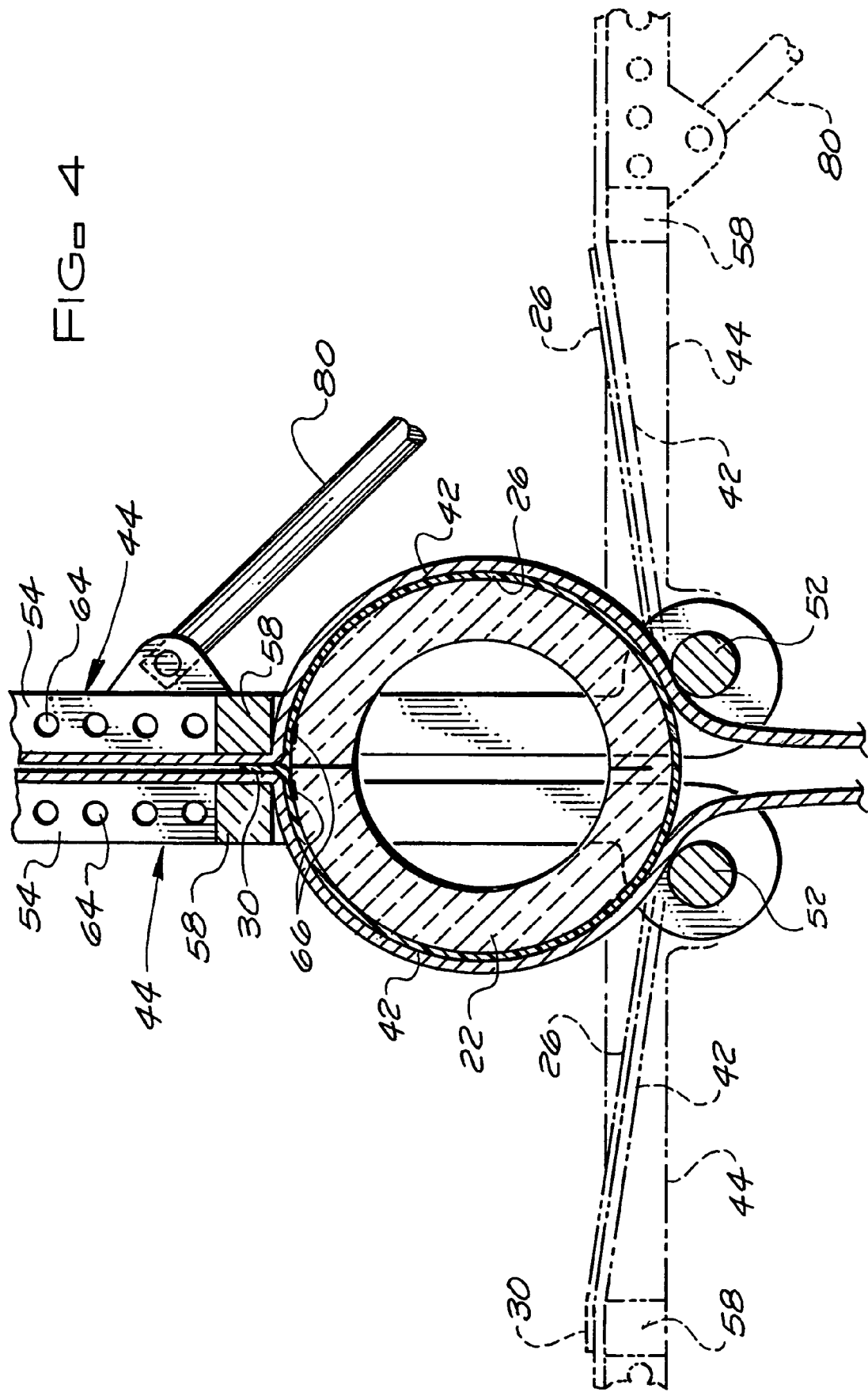
FIG. 4 is a partial schematic cross section, on a larger scale than FIG. 3, showing the support frames of the semiautomatic jacketing apparatus in the closed position for wrapping the sheet of jacketing material about the product (in solid line) and the open position for product loading and unloading (in phantom line).

While, as indicated above, the semiautomatic jacketing apparatus and method of the subject invention may be used to form various jacketed cylindrical products, the semiautomatic jacketing apparatus and method of the subject invention are particularly well suited for manufacturing pieces jacketed tubular pipe insulation 20. Accordingly, for the purposes of describing the operation of the semiautomatic jacketing apparatus and the method of the subject invention, the operation of the apparatus and method will be described in connection with the jacketing of a piece of tubular pipe insulation 22. However, it is to be understood that the apparatus of the subject invention and its operation and the method of the subject invention, as described, may also be used to jacket other products having generally cylindrical outer surfaces.

FIG. 1 shows a typical jacketed piece of tubular pipe insulation 20 that has been jacketed with the semiautomatic jacketing apparatus and by the jacketing method of the subject invention. The jacketed piece tubular pipe insulation 20 is commonly installed on the pipes of hot and cold piping systems to retard the flow of heat between the pipes of the system and the ambient environment and conserve energy. The jacketed piece of tubular pipe insulation 20 includes a tubular piece of pipe insulation 22 with a longitudinally extending slit 24 that passes completely through the tubular wall of the pipe insulation on one side and into the interior of and part of the way through the tubular wall of the pipe insulation on the opposite side of the pipe insulation so that the pipe insulation can be opened, passed over, and closed about a pipe. The jacket 26 of the jacketed piece of pipe insulation 20 is wrapped circumferentially about the tubular piece of pipe insulation 22 so that the longitudinal edge portion 28 of the jacket and the sealing tab 30 of the jacket extend adjacent and parallel to but do not overlap the slit 24. Once the jacketed piece of tubular pipe insulation 20 is placed on a length of pipe, the sealing tab 30 can be placed over the slit 24 and adhesively sealed to the longitudinal edge portion 28 of the jacket to seal the jacketed piece of pipe insulation about the pipe. The pipe insulation is jacketed to enhance the performance of the pipe insulation (e.g. to retard the transmission of water vapor); to prevent the pipe insulation from being exposed to contaminants; to make the pipe insulation more aesthetically pleasing; to protect the pipe insulation from adverse climatic conditions; and to serve as a means for securing and sealing the pipe insulation in place on the pipes of a piping system. Tubular pipe insulation such as that which can be jacketed by the apparatus and method of the subject invention is typically made from glass fibers bonded together with a thermosetting resin, ranges in length from about 36 inches (about 0.92 m) to about 48 inches (about 1.22 m), and ranges in outside diameter between about 2 inches (about 50 mm) and about 23 inches (about 600 mm).

As shown in FIGS. 2 to 4, the semiautomatic jacketing apparatus of the subject invention 40 for jacketing a product having a generally cylindrical outer surface such as tubular pipe insulation 22 includes first and second belt segments 42, first and second pivotally mounted support frames 44, and a drive mechanism 46 for pivoting the support frames 44 between open and closed positions. Preferably, the semiautomatic jacketing apparatus 40 also includes an adhesive applicator mechanism 48 and a guide mechanism 50 for properly aligning the product to be jacketed in the apparatus.

As shown in FIGS. 2 to 4, the belt segments 42 of the semiautomatic jacketing apparatus 40 are used to conform a sheet of jacketing material 26 to and press the sheet of jacketing material against the generally cylindrical outer surface of the piece of tubular pipe insulation 22 or other product being jacketed. The belt segments 42 each have a width substantially equal to or greater than the length of the generally cylindrical outer surface of the piece of tubular pipe insulation 22 or other product being jacketed and a length at least substantially equal to and preferably greater than one half of the circumference of the piece of tubular pipe insulation 22 or other product being jacketed. In a preferred embodiment of the semiautomatic jacketing apparatus 40, the belt segments 42 have lengths that enable the apparatus to be used to jacket products of different diameters e.g. products having diameters ranging from about 2 inches (about 50 mm) to about 23 inches (about 600 mm) for tubular pipe insulation.

The first and second support frames 44 of the semiautomatic jacketing apparatus 40 support the belt segments 42 and are pivotal between an open position shown in phantom line in FIGS. 3 and 4 to a closed position shown in solid line in FIGS. 2 to 4. The first and second support frames 44 are each affixed to first and second drive rods 52, respectively, and include first and second end frame members 54, a first cross frame member 56, and a second cross frame member 58. As shown, end portions 60 of the belt segments 42 are wrapped about and affixed to the first cross frame members 56 of the support frames 44.

The drive mechanism 46 pivots the support frames 44 in unison back and forth between the open position and the closed position about the axes of the drive rods 52 while the piece of tubular pipe insulation 22 or other product being jacketed remains stationary in the apparatus 40. The first and second drive rods 52 are spaced from and extend parallel with respect to each other. The drive mechanism 46 also includes a pair of pneumatic cylinders 80 and two sets of meshing gears 82 that are affixed to the ends of the drive rods 52. The pneumatic cylinders 80 are only mounted on the first of the two support frames 44. However, with the two sets of meshing gears 82 affixed to the ends of the drive rods 52, when the pneumatic cylinders 80 pivot the first support frame 44 about the axis of the first drive rod 52 to which that support frame is affixed, the gear 82 on that first drive rod 52 drives the meshing gear 82 on the second drive rod 52 to thereby pivot the second support frame 44 in unison with the first support frame member 44 back and forth between the closed and open positions of the support frame members 44. With the pistons of the pneumatic cylinders 80 in their extended positions, the support frames 44 are in their closed positions. With the pistons of the pneumatic cylinders 80 in their retracted positions, the support frames 44 are in their open positions.

In the open position shown in phantom line in FIGS. 3 and 4, the support frame members 44 each extend in a generally horizontal direction and the belt segments 42 extend from the first cross frame members 56 of the support frames 44 over the second cross frame members 58 of the support frames 44, over the drive rods 52, and down between the drive rods 52 a sufficient distance to provide the required belt lengths for the belt segments 42 to be wrapped approximately half the distance around the circumference of the products 22 being jacketed. In the closed position, the support frames 44 each extend in a generally vertical direction and the belt segments 42 are: located between the support frames 44; have portions extending from the first cross frame members 56 to and over the second cross frame members 58 that are brought into contact with or in very close proximity to each other; have portions that are wrapped part of the way about the circumference of the generally outer cylindrical surface of the product 22; and have portions extending down between the drive rods 52.

The second cross frame members 58 of the support frames 44 are adjustably mounted on the end frame members 54 so that the second cross frame members 58 can be positioned to jacket products of different diameters. While other fastening means could be used to secure the second cross frame members 58 to the end frame members 54 such as quick connect and release mechanisms, as shown, the second cross frame members 58 are bolted to the end frame members 54 by bolts 62 which are selectively passed through any of a series of bolt holes 64 in the end frame members and threaded into the ends of the second cross frame members 58. By positioning the second cross frame members 58 closer to the first cross frame members 56 and farther away from the drive rods 52, products having larger diameters can be jacketed. By positioning the second cross frame members 58 farther away from the first cross frame members 56 and closer to the drive rods 52, products having smaller diameters can be jacketed. The belt segments 42 of the semiautomatic jacketing apparatus 40 may be parts of a single belt or parts of separate belts.

With the support frames 44 in the open position, one or more sheets of jacketing material 26 (preferably a plurality of 10 or more separate sheets of jacketing material) can be placed on the first and second belt segments 42, bridging the gap between the belt segments 42 where the belt segments pass over and are supported by the drive rods 52, and the generally cylindrical product 22 can be placed on the sheet(s) of jacketing material 26. The generally cylindrical product 22 is placed on the sheet(s) of jacketing material 26 with the product extending parallel to the drive rods 52 and supported on the sheet(s) jacketing material 26 and belt segments 42 by and between the drive rods 52. With the support frames 44 in the closed position, the belt segments 42 are each wrapped part of the way around generally cylindrical outer surface of the product 22 and conform the sheet of jacketing material 26 to and press the sheet of jacketing material 26 against the generally cylindrical outer surface of the product 22 so that the sheet of jacketing material 26 is bonded to the generally cylindrical outer surface of the product 22 to form the jacketed product 20. Where there are a plurality of sheets of jacketing material 26 overlying the belt segments 42, since only the uppermost sheet of jacketing material 26 is brought into contact with the adhesive that bonds the sheet of jacketing material to the generally cylindrical outer surface of the product, only the uppermost sheet of jacketing material 26 is bonded to the product 22 and the remaining sheets of jacketing material fall away from the jacketed product 22 when the support frames 44 are pivoted back to the open position.

The pivotal movement of the support frames 44 from the open position to the closed position draws the belt segments 42 over the drive rods 52 that support the belt segments, the sheet(s) of jacketing material 26, and the product 22 with a force less than that required to crush the product 22 and greater than that required to overcome friction between the belt segments 42 and the sheet(s) of jacketing material 26. This enables the semiautomatic jacketing apparatus 40 and method of the subject invention to be used for the jacketing of products, such as fiberglass pipe insulation, without crushing or otherwise damaging the products and reducing their performance characteristics such as their thermal insulating properties.

The line diagrams of FIGS. 5 to 8 illustrate the manner in which the belt segments 42 are drawn over the drive rods 52 and the sheet(s) of jacketing material 26 to wrap about the generally cylindrical outer surface of a piece of tubular pipe insulation 22 while the piece of pipe insulation is stationary in the apparatus. In these Figures, the points where the belt segments 42 pass over the drive rods 52 are labeled "A" and the points where the belt segments pass over the second cross frame members 58 are labeled "B".

Figure 5:
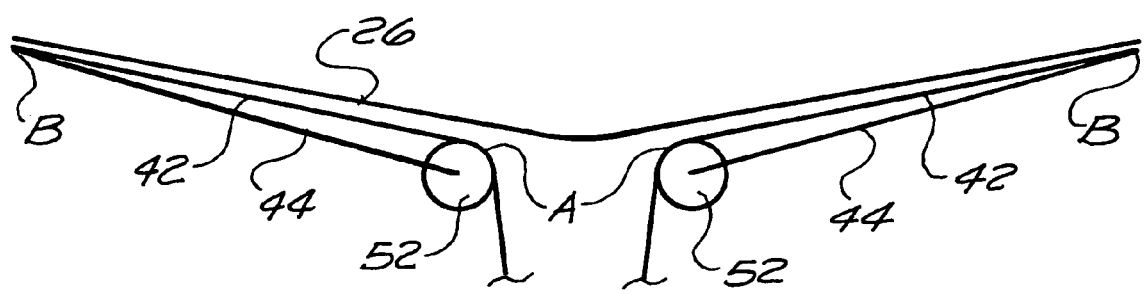
FIG. 5 is an end view of semiautomatic jacketing apparatus of the subject invention schematically showing the location of the frames and belts of the apparatus when the apparatus is in the open position for loading a product to be wrapped, a sheet of jacketing material overlies the belts (shown spaced above the belts for clarity), and the apparatus is ready to receive a product to be wrapped.

In FIG. 5, the support frame members 44 are in their open position. A sheet of jacketing material 26 is schematically shown overlaying the first and second belt segments 42 and bridging the gap between the first and second belt segments where the belt segments pass over the drive rods 52. The sheet of jacketing material 26 is located on the first and second belt segments 42 so that when the sheet of jacketing material 26 is wrapped about the product being jacketed, the longitudinal edge portion 28 of the jacket and the sealing tab 30 of the jacket will extend adjacent and parallel to but not overlap the slit 24. A series of spaced apart lines on one of the belt segments 42, extending parallel to the drive rods 52, can be used to properly position different size sheets of jacketing material 26 on the belt segments 42 to jacket pipe insulation of different diameters. By aligning one edge of a sheet of jacketing material 26 with a designated line for a piece of pipe insulation of a particular diameter, when the sheet of jacketing material 26 is wrapped about a piece of pipe insulation of the designated diameter that is properly aligned on the apparatus, the longitudinal edge portion 28 and the tab 30 are properly located relative to the slit 24.

Figure 6:
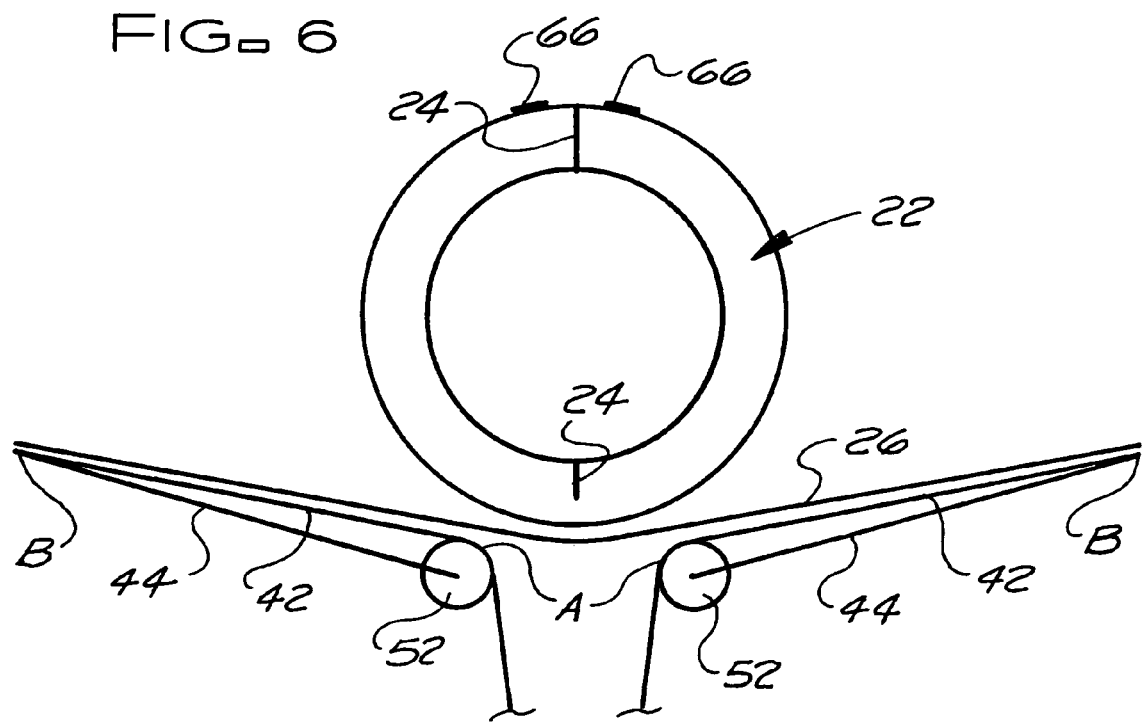
FIG. 6 is an end view of semiautomatic jacketing apparatus of the subject invention schematically showing the location of the frames and belts of the apparatus when the apparatus is in the open position for loading a product to be wrapped, a sheet of jacketing material overlies the belts (shown spaced above the belts for clarity), and a product to be wrapped is loaded onto the apparatus and has two beads of adhesive thereon for bonding the sheet of jacketing material to the product.

In FIG. 6, a piece of tubular pipe insulation 22 with a generally cylindrical outer surface has been placed on the sheet(s) of jacketing material 26 with the piece of tubular pipe insulation 22 extending parallel to the drive rods 52 and supported by and between the drive rods 52. The slit 24 in the piece of tubular pipe insulation 22 has been properly aligned for the jacketing operation and an adhesive 66 has just been applied to the pipe insulation for bonding the jacketing material 26 to the pipe insulation 22. While the adhesive 66 could be applied to a substantial portion or substantially the entire outer surface of the pipe insulation 22, in one preferred form of the invention the adhesive 66 is only applied to the pipe insulation adjacent to and on each side of the slit 24 and may be applied as beads of a hot melt or other adhesive in longitudinally extending continuous or discontinuous lines located adjacent and on each side of the slit 24.

Figure 7:
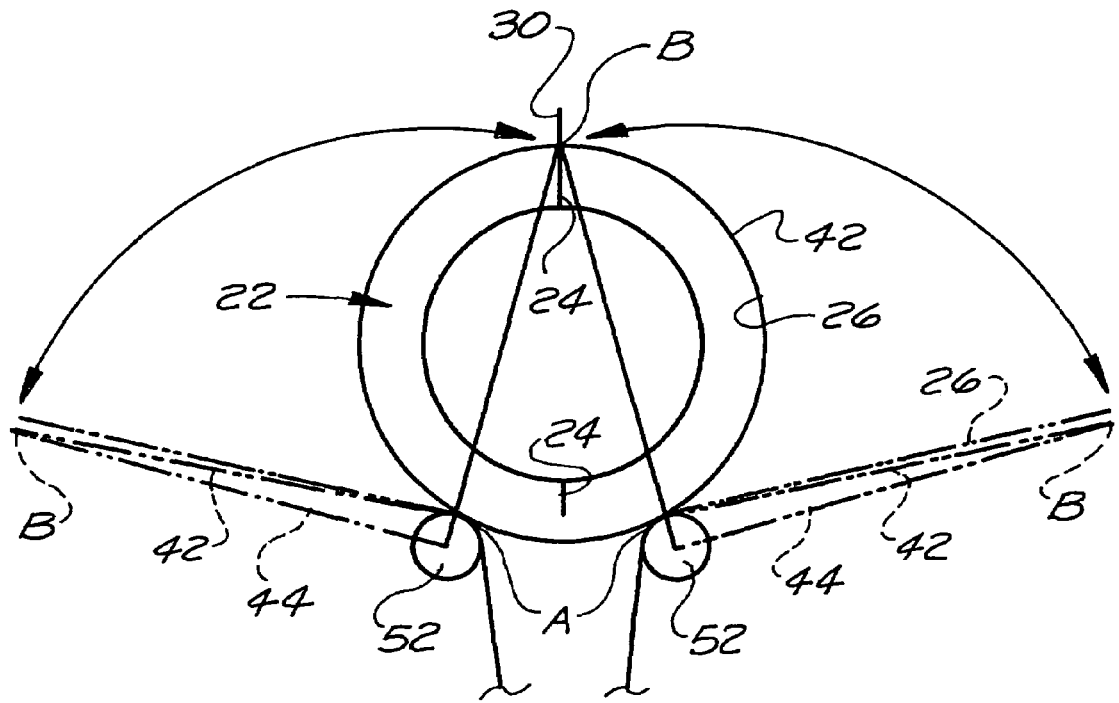
FIG. 7 is an end view of semiautomatic jacketing apparatus of the subject invention schematically showing the location of the frames and belts of the apparatus (in phantom line) when the apparatus is in the open position for loading a product to be wrapped and showing the location those components (in solid line) when a sheet of jacketing material is wrapped about and pressed against the product by the belts to bond the sheet of jacketing material to the product.

In FIG. 7, the support frame members 44 are in their closed position and the sheet of jacketing material 26 and belt segments 42 are wrapped tightly about the generally cylindrical outer surface of the piece of pipe insulation 22. The movement of the support frame members 44 from their open position (shown in solid line FIGS. 5 and 6 and in phantom line in FIG. 7) to their closed position (shown in solid line in FIG. 8) causes the belt segments 42 to be drawn over the drive rods 52 and the sheet of jacketing material 26 while the piece of pipe insulation 22 remains stationary. As the belt segments 42 are drawn over the sheet of jacketing material 26, the friction between the belt segments 42 and the sheet of jacketing material 26 exerts a force on the sheet of jacketing material 26 that draws the sheet of jacketing material taught and smooth as the sheet of jacketing material 26 is wrapped about the generally cylindrical outer surface of the piece of pipe insulation 22 by the belt segments. The distance each of the belt segments 42 move relative to the sheet of facing material 26 is the difference between the straight line distance between points A and B and the arcuate distance in FIG. 7 between points A and B around the generally cylindrical outer surface of the piece of pipe insulation 22.

Figure 8:
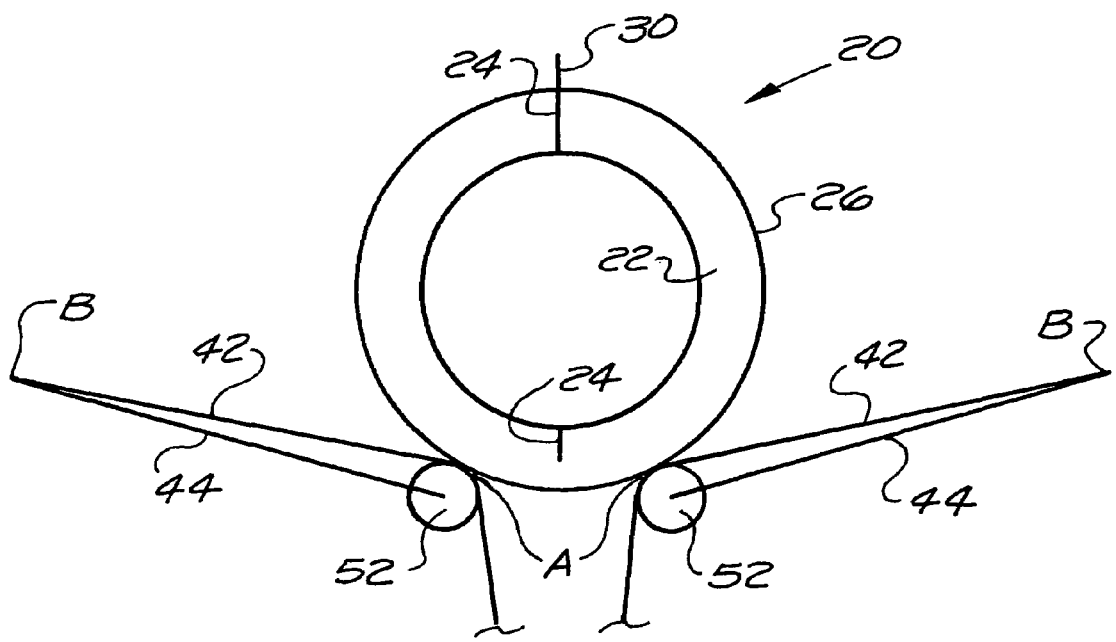
FIG. 8 is an end view of semiautomatic jacketing apparatus of the subject invention schematically showing the location of the frames and belts of the apparatus when the apparatus is in the open position for unloading a finished product after a sheet of jacketing material has been wrapped about, pressed against, and bonded to the product.

In FIG. 8, the support frame members 44 are back in their open position and jacketed piece of pipe insulation 20 is ready to be removed from the semiautomatic jacketing apparatus 40.

Preferably, the semiautomatic jacketing apparatus 40 has an adhesive applicator 48 for automatically applying an adhesive 66 (e.g. a hot melt or other conventional adhesive) to the generally cylindrical outer surface of the piece of pipe insulation or other product 22 being jacketed or the uppermost sheet of jacketing material 26. Preferably, the adhesive 66 is applied after the piece of pipe insulation or other product being jacketed has been properly positioned in the apparatus 40 on the sheet(s) of jacketing material 26. Typically, the adhesive 66 is applied as two continuous or discontinuous beads of adhesive that extend longitudinally along the length of the generally cylindrical outer surface of the product 22 to bond the lateral edge portions of the sheet of jacketing material and thus the sheet of jacketing material 26 to the generally cylindrical outer surface of the product. Immediately after the two longitudinally extending adhesive beads 66 are automatically applied to the generally cylindrical outer surface of the product 22 by the operators actuation of the apparatus 40, the belt segments 42 are each automatically wrapped part of the way around the generally cylindrical outer surface of the product 22 to conform the sheet of jacketing material 26 to, press the sheet of jacketing material 26 against, and bond the sheet of jacketing material to the generally cylindrical outer surface of the product by means of the adhesive beads 62. As shown in FIG. 2, the adhesive application mechanism 48 can be a mechanism supported on a rail 68, centered over the product 22 to be jacketed when that product is properly positioned in the apparatus, and moved along the length of the rail and the product as the mechanism deposits the adhesive onto the product e.g. in the form of adhesive beads 66. The adhesive application mechanism deposits the adhesive 66, e.g. as a pair of adhesive beads 66, on the product on each pass and where the product 22 has a longitudinal slit such as the slit 24 in the pipe insulation, deposits the adhesive on each side of the slit 24.

Where the semiautomatic jacketing apparatus 40 is used to jacket products with a slit or other feature with which the sheet of jacketing material 26 must be properly aligned, such as tubular pipe insulation 22 that has a longitudinally extending slit 24, the apparatus is preferably provided with a guide mechanism 50. A preferred guide mechanism 50 for use with the jacketing of tubular pipe insulation is a laser beam 70 that is projected longitudinally along the length of the cylindrical outer surface of the piece of pipe insulation 22 so that when the slit 24 in the piece of pipe insulation is aligned with the laser beam, the piece of tubular pipe insulation 22 is properly aligned for jacketing.

In the semiautomatic method of the subject invention, a product 22 having a generally cylindrical outer surface, such as a piece of tubular pipe insulation, is manually placed and properly positioned on the semiautomatic jacketing apparatus and the semiautomatic apparatus is activated to apply an adhesive to the generally cylindrical outer surface of the product and wrap the sheet of jacketing material about the product. Once the sheet of jacketing material has been wrapped about and bonded to the product, the jacketed product 20 is manually removed from the apparatus. Where the product 22 requires the proper alignment (registration) of a feature such as the slit 24 in the pipe insulation with the sheet of jacketing material, preferably, the product 22 is positioned on the apparatus using the guide mechanism 50 of the apparatus.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method for jacketing a product having a generally cylindrical outer surface, a circumference, and a length, comprising:
   providing a product having a generally cylindrical outer surface, a circumference, and a length;
   providing a sheet of jacketing material having a width substantially equal to or greater than the circumference of the product and a length substantially equal to the length of the product;
   locating the sheet of jacketing material on first and second belt means for conforming the sheet of jacketing material to and pressing the sheet of jacketing material against the generally cylindrical outer surface of the product and locating the product on the sheet of jacketing material; the first and second belt means each having a width substantially equal to or greater than the length of the generally cylindrical outer surface of the product and a length substantially equal to or greater than one half of the circumference of the product;
   wrapping the first and second belt means part of the way around the generally cylindrical surface of the product while maintaining the product stationary to conform the sheet of jacketing material to and press the sheet of jacketing material against the generally cylindrical outer surface of the product so that the sheet of jacketing material may be bonded to the generally cylindrical outer surface of the product.

2. The method according to claim 1, including:
   applying an adhesive to the generally cylindrical outer surface of the product to bond the sheet of jacketing material to the generally cylindrical outer surface of the product when the first and second belt means are each wrapped part of the way around the generally cylindrical outer surface of the product to conform the sheet of jacketing material to and press the sheet of jacketing material against the generally cylindrical outer surface of the product.

3. The method according to claim 2, wherein:
   the adhesive is applied to the generally cylindrical outer surface of the product in two longitudinally extending lines adjacent where first and second edge portions of the sheet of jacketing material are located by the first and second belt means when the first and second belt means are each wrapped part of the way around the generally cylindrical outer surface of the product.

4. The method according to claim 1, wherein:
   first and second frame means are used for wrapping the first and second belt means about the product to conform the sheet of jacketing material to and press the sheet of jacketing material against the generally cylindrical outer surface of the product so that the sheet of jacketing material may be bonded to the generally cylindrical outer surface of the product; the first and second frame means each being pivoted from a first position where the sheet of jacketing material can be placed on the first and second belt means and the product can be placed on the sheet of jacketing material to a second position where the first and second belt means are each wrapped part of the way around generally cylindrical outer surface of the product to conform the sheet of jacketing material to and press the sheet of jacketing material against the generally cylindrical outer surface of the product so that the sheet of jacketing material may be bonded to the generally cylindrical outer surface of the product.

5. The method according to claim 4, wherein:
   the first belt means passes over a first rod means for pivotally supporting the first frame means and has an end portion secured to a free end portion of the first frame means whereby when the first frame means is pivoted from the first position to the second position to wrap the first belt means part of the way around the generally cylindrical outer surface of the product and conform the sheet of jacketing material to the generally cylindrical outer surface of the product, the first belt means is drawn over the first rod means and the sheet of jacketing material as the first belt means is wrapped about the generally cylindrical surface of the product; and
   the second belt means passes over a second rod means for pivotally supporting the second frame means and has an end portion secured to a free end portion of the second frame means whereby when the second frame means is pivoted from the first position to the second position to wrap the second belt means part of the way around the generally cylindrical outer surface of the product and conform the sheet of jacketing material to the generally cylindrical outer surface of the product, the second belt means is drawn over the second rod means and the sheet of jacketing material as the second belt means is wrapped about the generally cylindrical surface of the product.

6. The method according to claim 5, wherein:

when the first frame means is pivoted from the first position to the second position and draws first belt means over the first rod means and the sheet jacket, the first belt means is drawn with a force less than that required to crush the product and greater than that required to overcome friction between the first belt means and the sheet of jacketing material; and when the second frame means is pivoted from the first position to the second position and draws second belt means over the second rod means and the sheet jacket, the second belt means is drawn with a force less than that required to crush the product and greater than that required to overcome friction between the first belt means and the sheet of jacketing material.

7. The method according to claim 6, including:

applying an adhesive to the generally cylindrical outer surface of the product to bond the sheet of jacketing material to the generally cylindrical outer surface of the product when the first and second belt means are each wrapped part of the way around the generally cylindrical outer surface of the product to conform the sheet of jacketing material to and press the sheet of jacketing material against the generally cylindrical outer surface of the product.

8. The method according to claim 7, wherein:

the adhesive is applied to the generally cylindrical outer surface of the product two longitudinally extending lines located adjacent where first and second edge portions of the sheet of jacketing material are located by the first and second belt means when the first and second frame means are each in the second position and the first and second belt means are each wrapped part of the way around the generally cylindrical outer surface of the product.

9. The method according to claim 1, wherein:

the product is fiber glass pipe insulation and has a tubular wall; the product has a longitudinal slit passing through the tubular wall from the generally cylindrical outer surface to an inner surface; and the adhesive is applied to the generally cylindrical outer surface of the product in two longitudinally extending lines located on either side of and adjacent the slit and adjacent where first and second edge portions of the sheet of jacketing material are located by the first and second belt means when the first and second belt means are each wrapped part of the way around the generally cylindrical outer surface of the product.

* * * * *